United States Patent [19]

Matsumoto et al.

[11] Patent Number: 5,166,726
[45] Date of Patent: Nov. 24, 1992

[54] PHOTOGRAPHING APPARATUS

[75] Inventors: Toshiya Matsumoto; Shinji Murata, both of Tokyo, Japan

[73] Assignee: Canon Kabushiki Kaisha, Tokyo, Japan

[21] Appl. No.: 606,822

[22] Filed: Oct. 31, 1990

[30] Foreign Application Priority Data

Nov. 7, 1989 [JP] Japan .................................. 1-287817

[51] Int. Cl.⁵ ............................................. G03B 27/44
[52] U.S. Cl. ......................................... 355/54; 355/64
[58] Field of Search ...................... 355/54, 64; 352/78

[56] References Cited

U.S. PATENT DOCUMENTS

| | | | |
|---|---|---|---|
| 3,434,783 | 3/1969 | Sakaki et al. | 352/72 |
| 3,690,751 | 9/1972 | Von Fischern et al. | 352/72 |
| 4,018,518 | 4/1977 | Wright | 352/78 R |
| 4,975,733 | 12/1990 | Kumagaya et al. | 355/64 |

Primary Examiner—Monroe H. Hayes
Attorney, Agent, or Firm—Fitzpatrick, Cella, Harper & Scinto

[57] ABSTRACT

A photographing apparatus, wherein a film storage unit is detachable from the main unit even when the film storage is reversed so that the positions of the supply and windup sides of film will be switched, enables a user to replace film for reciprocatory recording with the film loaded in the storage unit, and helps reduce fogging and improve operability.

15 Claims, 9 Drawing Sheets

PHOTOGRAPHING APPARATUS

BACKGROUND OF THE INVENTION

1. Field of the Invention

The present invention relates to a photographing apparatus for recording image information on an elongated film such as a roll film.

2. Related Background Art

This type of a prior photographing apparatus is referred to as a rotary type microfilm camera (hereafter, rotary camera). The prior art is described below with respect to the rotary camera as an example.

In the rotary camera, as shown in FIG. 15, a subject S to be photographed fed by a feeder 1 is transported at a certain speed. When the subject S passes through a photographing unit 2, film F in a camera unit 6 is fed at a speed corresponding to the magnification to the subject S, and then wound around a winding reel 8 via a supply reel 7. At this time, an image on the subject S illuminated by lamps 3a and 3b in the photographing unit 2 is formed on film F by a photographing lens 5 passing though a slit 4. Thus, continuous photography is done, enabling to record a large amount of image data to be recorded on the elongated film.

One of the photographing methods using the rotary camera is a reciprocatory method (also referred to as a duo method). Thereby one side of film F (½ of the film width) is exposed to form images of subjects S. Then, when the side a of film F has been exposed from its beginning to end (See FIG. 16), the film is re-loaded inversely on supply and winding reels 7 and 8, and then another side b of the film is exposed from its beginning to end. FIG. 16 shows film F which is exposed to form images of the subjects S on the first and second rows a and b by the reciprocatory method. This permits high recording density and effective use of film.

With the above prior art, when one side of film F has been exposed, the exposed film F must be temporarily extracted out of a camera unit 6 in which the film F is shielded from light and then be loaded again. This causes such problems that unnecessary film F is exposed to light, fogging occurs frequently, and operability is deteriorated.

This invention has for its object to solve the above problems of the prior art, aiming to supply a photographing apparatus minimizing fogging of film and permitting excellent operability for reciprocatory recording.

SUMMARY OF THE INVENTION

To achieve the above object, this invention provides, a photographing apparatus for photographing subjects on an elongated film by the reciprocatory method, wherein a film storage unit is detachable from the main unit even when the film storage unit is reversed so that the supply-side and windup-side film positions in the film storage will be switched.

The photographing apparatus having the above configuration allows a user to replace a film unit for reciprocatory photographing with the film loaded on the storage.

DESCRIPTION OF THE PREFERRED EMBODIMENTS

The first embodiment of this invention is described below with reference to FIGS. 1 to 6.

The photographing apparatus shown in the Figures is a rotary camera for recording image information as photographic originals, or checks or any other sheet-type subject on an elongated microfilm.

Figure 1:
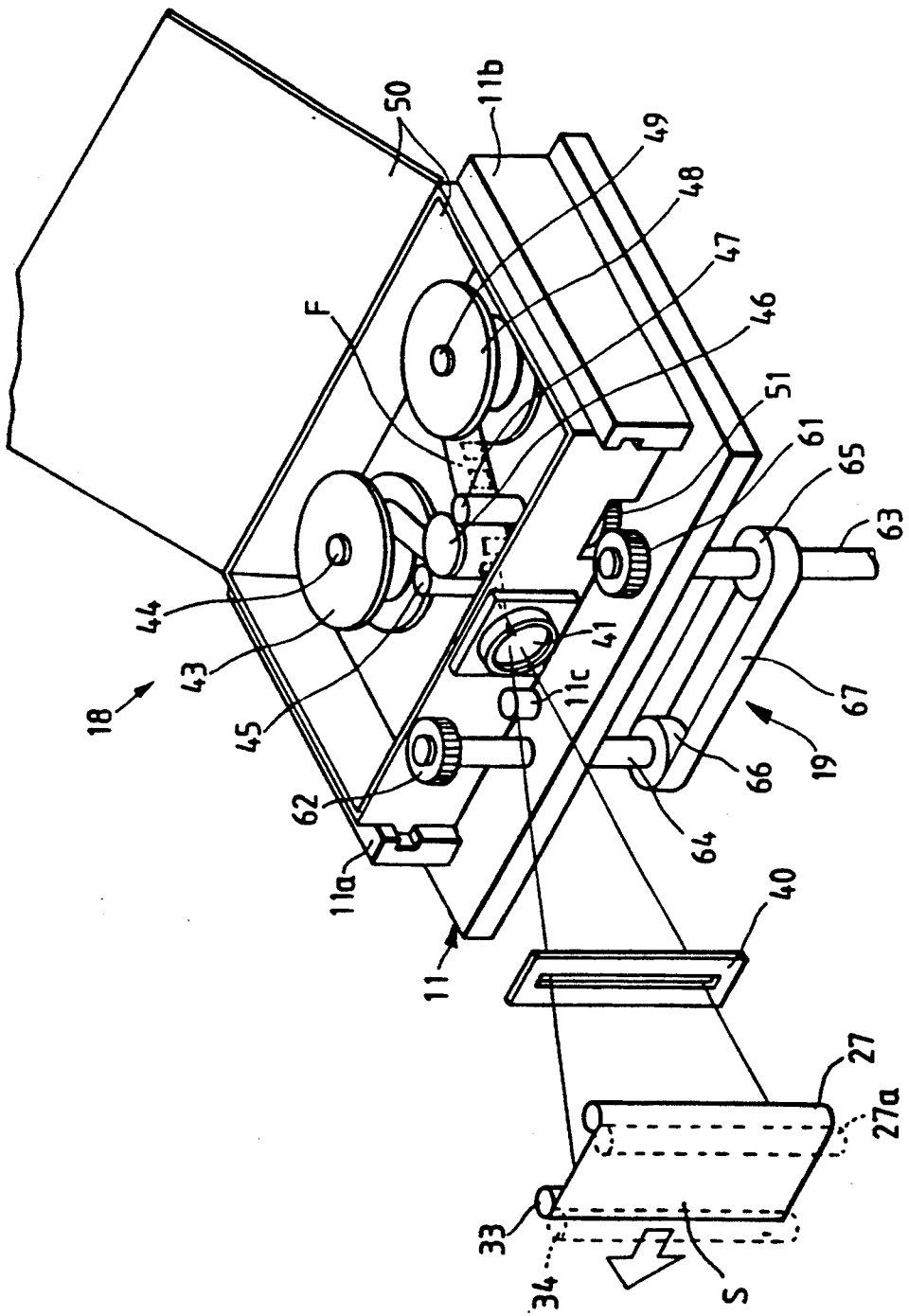
FIG. 1 shows a perspective view of a camera unit in a photographing apparatus of a first embodiment related to this invention.
Figure 2:
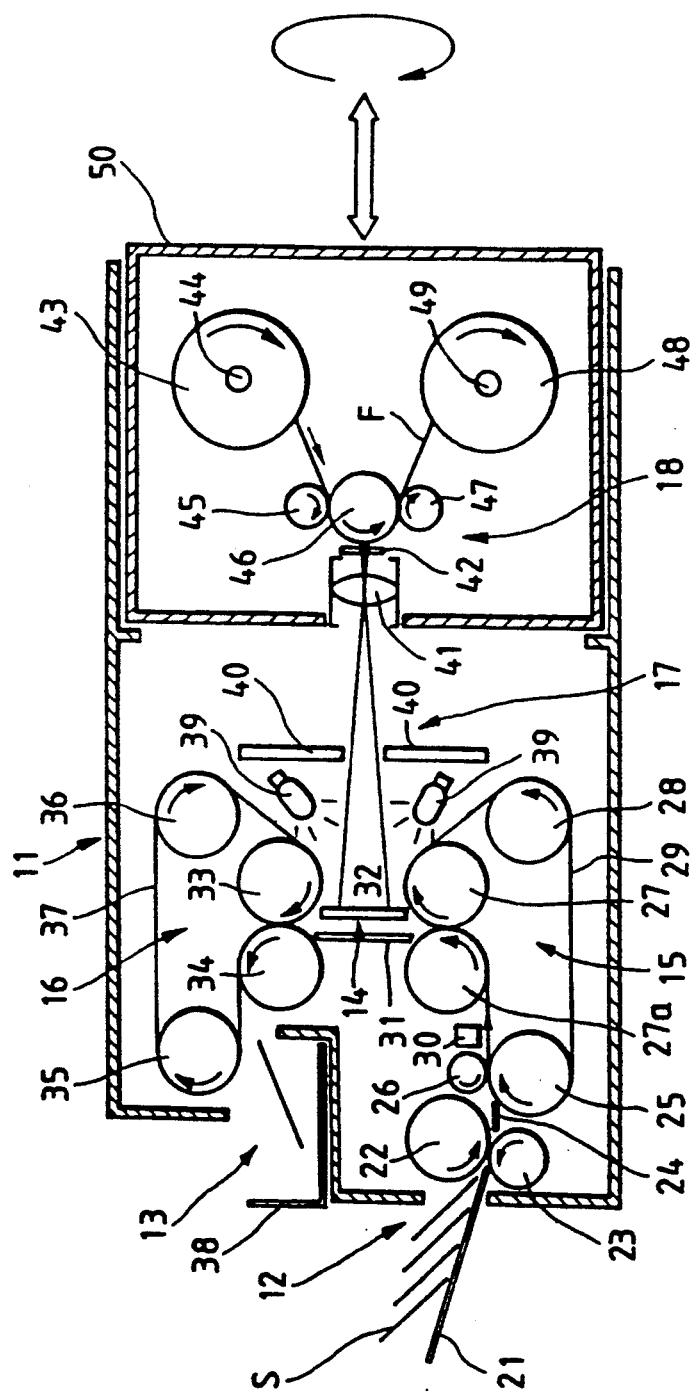
FIG. 2 is a schematic view of the photographing apparatus of the first embodiment.

In FIG. 2, a main unit of the photographing apparatus 11 comprises a supply unit 12 for supplying a subject S into the apparatus, a discharge unit 13 for discharging the exposed subject S outside the apparatus, a photographing unit 14 located inside the apparatus, an upstream transport unit 15 which works as a subject transport unit linking the supply unit 12 and the photographing unit 14, a downstream transport unit 16 linking the photographing unit 14 and a discharge unit 13, an illumination unit 17 for exposing microfilm F and forming an image of the subject S fed to the photographic unit 14 on the film F, a camera 18, and a driving unit unshown in the figure.

The supply unit 12 includes a tilted carrier 21 to allow a sheet-type subject S to slide down, and a feed roller 22 and a separating roller 23 to supply subjects S one by one. The supply roller 22 is composed of a rubber material whose friction coefficient is larger than that of the separating roller 23. These rollers rotate in the arrow directions by means of the driving unit unshown in FIG. 2. A first guide plate 24 to route the subject S fed by the feed roller 22 to the entrance of the upstream transport unit 15 is also installed.

The upstream transport unit 15 includes a pair of first and second rollers 25 and 26 located downstream of the supply unit 12, a pair of third and fourth rollers 27 and 27a installed located downstream of the photographic unit 14 (at the entrance), and a first transport belt 29 wound around the first and third rollers 25 and 27 via a guide roller 28. The rollers and belt rotate in the arrow directions by means of a driving unit unshown in FIG. 2, so that a subject S will be fed from the supply unit 12 to the photographing unit 14. In addition, a sensor 30 for detecting the passage of a subject S is installed between the second and fourth rollers 26 and 27a.

The photographing unit 14 comprises a second guide plate 31 and guide glass plate 32 which are in parallel with each other with an interspace therebetween. The subject S fed by the upstream transport unit 15 passes between the second guide plate 31 and guide glass plate 32.

Behind the photographing unit 14, a pair of illumination lamps 39 to illuminate a subject S passing through the photographing unit 14, an illumination unit 17 including a slit 40 which restricts the light path, a photographing lens 41, a shutter 42, and a camera unit 18 accommodating microfilm F and having a film transport mechanism to be mentioned later are arranged. Thereby, image information of a subject S passing through the photographing unit 14 is formed on microfilm F in the camera unit 18 with light emitted through the slit.

The downstream transport unit 16 includes a pair of fifth and sixth rollers 33 and 34 installed above the photographic unit 14, a seventh roller 35 installed in the vicinity of the discharge unit 13, and a second transport belt strung between the fifth and seventh rollers 33 and 35 via a guide roller 36. The rollers and belt rotate in the arrow directions by means of the driving unit unshown in FIG. 2, whereby the subject S is discharged from the photographic unit 14 to the discharge unit 13. The subject S fed and discharged by the downstream transport unit 16 is stacked on a subject discharge tray 38 in the discharge unit 13.

The camera unit 18 encapsulated in a rectangular case or a camera chamber 50 which accommodates microfilm comprises the photographing lens 41 and shutter 42 mentioned above, as well as a first reel 43 attached to a first shaft 44, a second reel 48 attached to a second shaft 49, a capstan roller 46 which touches first and second pinch rollers 45 and 47 behind the shutter 42, a camera driving unit mentioned later, and a rotating speed detecting means (unshown) for the first and second shafts 44 and 49. The first and second sliding bars 50a and 50b on both sides of the camera chamber 50 are fitted into first and second rails of the main unit 11, and slided along them (See FIG. 3.). When the bars 50a and 50b touch a positioning pin 11c, the first bar 50a is fitted to a lock claw 11d attached to the first rail 11a. Thus, the camera chamber is detachable from the main unit 11.

In addition, a camera coupling gear 51 for coupling a driving force from a main unit driving unit 19 mentioned later is provided as a camera driving unit outside the camera chamber 50. A first belt 52 is strung between a pulley 51a united with the camera coupling gear, 51 coaxially and a pulley 46a united with the capstan 46 (See FIG. 4.) A friction roller 53 in contact with the pulley 46a is supported to be freely rotative. The first and second shafts 44 and 49 are provided with first and second one-way clutches 56 and 57. Belts 54 and 55 are strung between the friction roller 53, and the first and second one-way clutches 56 and 57.

Figure 3:
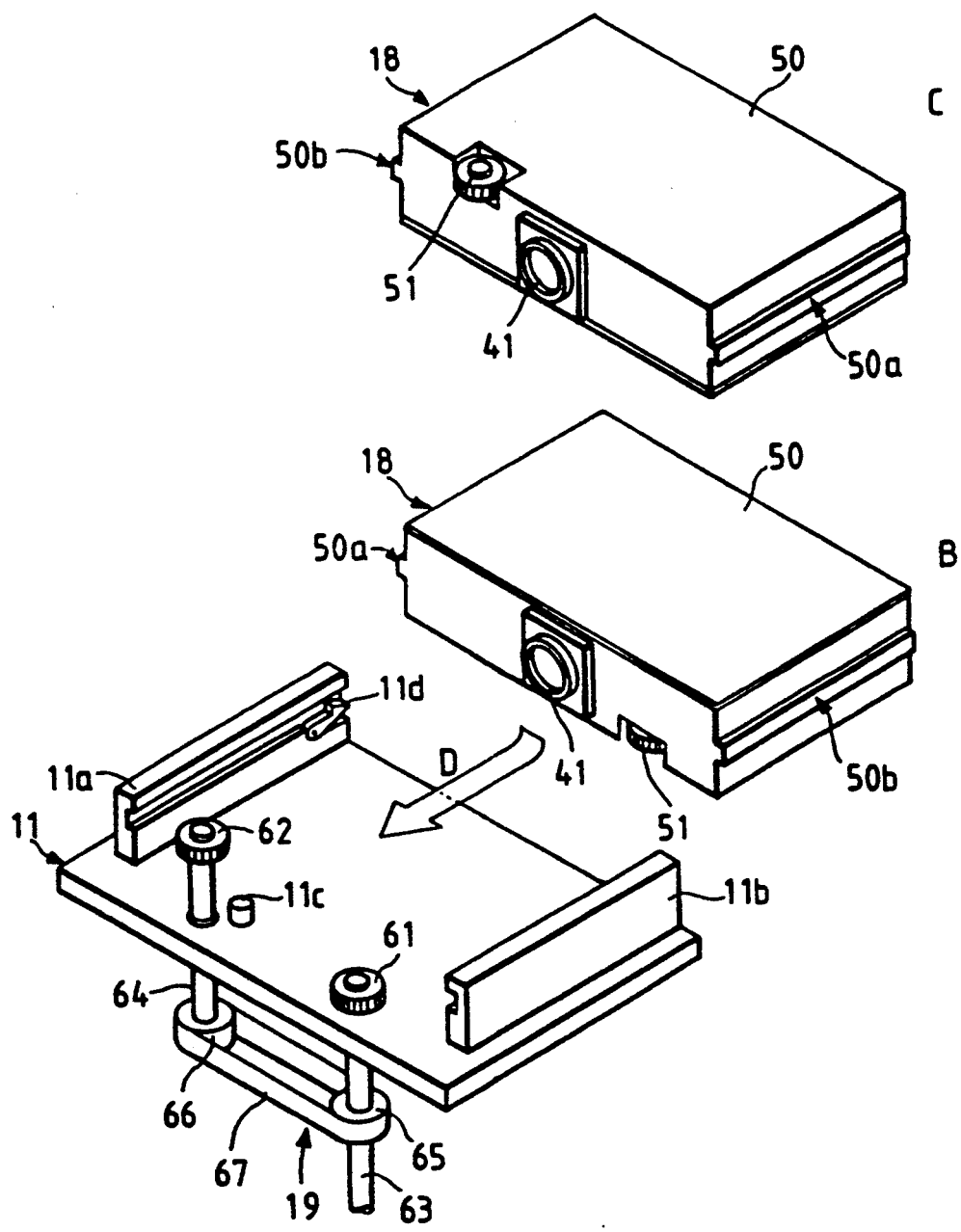
FIG. 3 shows a perspective view demonstrating how to set the camera unit to the main unit.

On the other hand, the camera driving unit 19 for driving the camera unit 18 is provided with first and second driving gears 61 and 62 which are selectively engaged with the camera coupling gear 51, depending on the state of mounting the camera unit 18 to the main unit 11 (B and C shown in FIG. 3). The first and second driving gears 61 and 62 are supported by a driving shaft 63 and a subordinate shaft 64. A pulley 65 fixed to the driving shaft 63 and a pulley 66 fixed to the subordinate shaft 64 are linked with a driving belt 67. Thus, the main driving unit 19 to drive the camera unit 18 is constituted.

Figure 4:
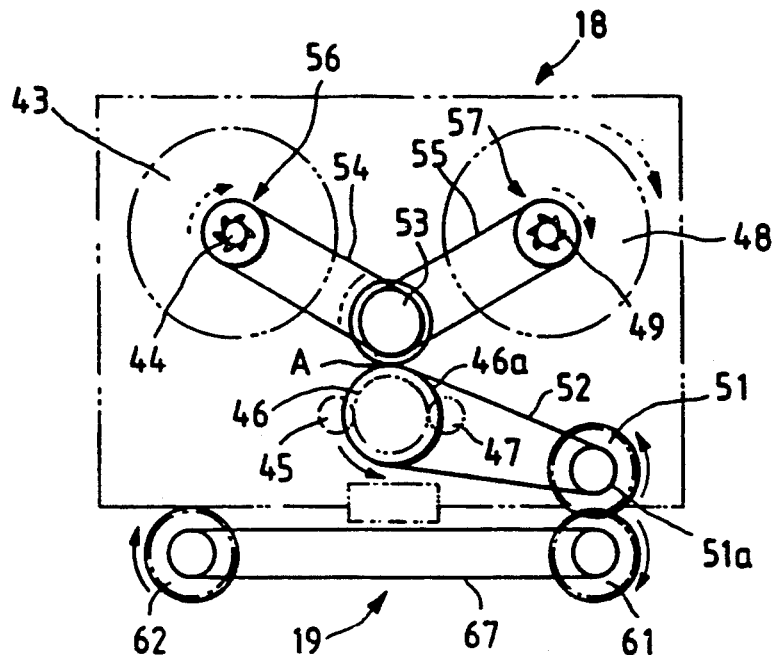
FIG. 4 is a schematic view showing one driving unit of the camera unit.
Figure 5:
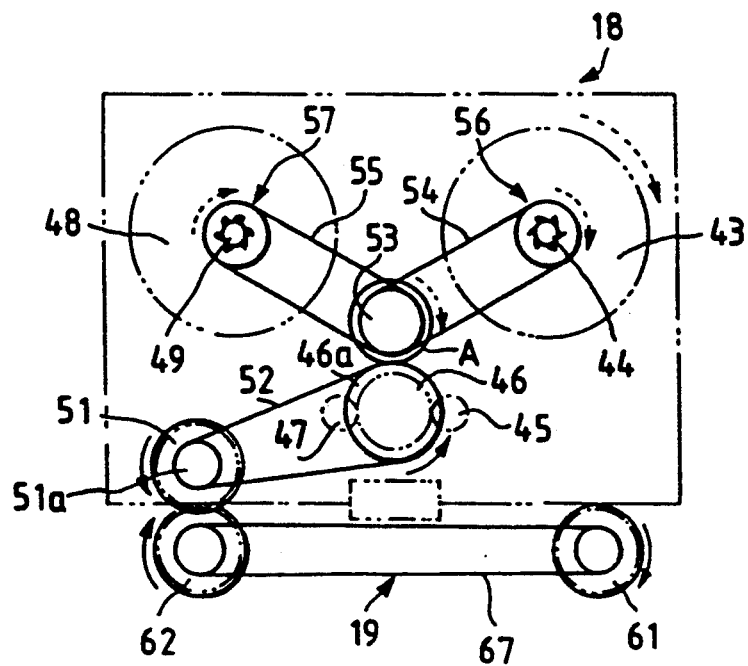
FIG. 5 is a schematic view showing another driving unit when the camera unit is reversed.

In an embodiment of this invention having the above configuration, in the case where the camera unit 18 is mounted as shown in FIG. 4 wherein a coupling gear 51 and the first driving gear 61 are engaged with each other, the driving force from the main unit 11 is transferred from the first driving gear 61 of the main unit driving unit 19 to the camera coupling gear 51a of the camera unit 18, and then causes the capstan roller 46 to rotate in the direction of an arrow C via the first belt 52. In addition, the rotation is transferred to the friction roller 53 due to friction generated at a contact area A. Then, the rotation is transferred to first and second one-way clutches 56 and 57, as shown by arrows, via second and third belts 54 and 55. The first one-way clutch 56 runs idle. Therefore, the rotation is not transferred to the first shaft 44. However, the second one-way clutch 57 transfer the rotation to the second shaft 49. Eventually, the second reel 48 rotates with a constant torque. If an excessive torque is loaded on the second shaft 49, the contact area A slips and runs idle.

The actuation of the main unit driving unit 19 and the open/close operation of the shutter 42 in the camera unit 18 are controlled according to information sent from the subject detecting sensor 30 installed in the upstream transport unit 15 in the main unit 11. (See FIG. 1.) Microfilm F, being wound around the second reel 48 attached onto the second shaft 49 passing through the capstan roller 46 from the first reel 43 attached to the first shaft 43, moves at a speed corresponding to the magnification of a subject S. At this time, the shutter 42 is opened and the subject S is photographed on one side of the microfilm F on the capstan roller 46 (first row). The exposed microfilm F is wound around the second reel 48 with a constant torque. When the microfilm F around the first reel 43 is running out and the first reel 43 and first shaft 44 rotate faster, a rotating speed detecting means (unshown) detects the fact that the amount of remaining film is small. Photographing is disabled and the main unit driving unit 19 stops. Both ends of film are secured so that they will not part from the reels 43 and 48. The first and second sliding bars 50a and 50b are symmetric each other with respect to an optical axis of the photographing lens 41 as a center. As shown in FIG. 3, the camera unit 18 removed from the main unit 11 is reversed from the state B (See FIG. 1) to the state C (See FIG. 3. Second state) and then re-mounted to the main unit. Namely, even if the camera unit 18 is turned 180° in the circumferential direction of the photographing lens 41, the camera unit 18 can be set to the main unit 11 by moving the camera unit 18 in the direction of an arrow D.

When the camera unit 18 is set to the main unit in the state C (shown in FIG. 3), the driving force from the main unit 11 causes the first driving gear 61 of the main unit driving unit 19 to rotate, and the rotation eventually causes the second driving gear 62 to rotate via the driving belt 67. Then, when the second drive gear 62 is engaged with the camera coupling gear in the camera unit 18, the driving force is coupled to cause the first and second one-way clutches 56 and 57 to rotate in the arrow directions as mentioned previously. However, in this case, the first one-way clutch 56 couples the rotation to the first shaft 44, causing the first reel 43 to rotate with a constant torque. However, the second one-way clutch 57 runs idle and the rotation is not coupled to the second shaft 49. Compared with the states shown in FIG. 1 and 4, the positional relations of the first and second shafts 44 and 49 with respect to the main unit 11 are switched. However, the basic performance including the film forwarding direction with respect to the main unit remains unchanged. When the camera unit 18 is mounted in the state C, subjects S are photographed on the second row of microfilm F.

Figure 6:
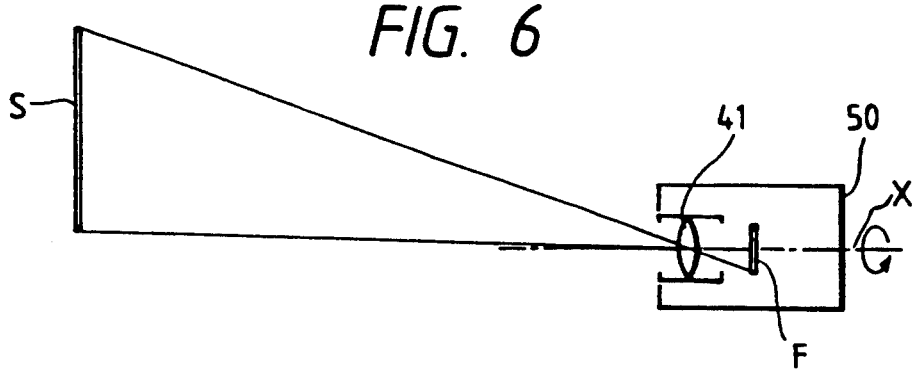
FIG. 6 is a schematic view showing the photographing light path.

FIG. 6 shows the light path in this embodiment. The reference axis X of a photographic lens 41 aligns along the center line in the longitudinal direction of the microfilm F. A subject S is photographed on one side (first row) of film F with respect to the center line. Accordingly, the camera unit 18 can be rotated 180° With the reference axis X of the photographic lens 41 as an axis. When the camera unit 18 is mounted in the state C in FIG. 4, another side (second row) of the film F which is not exposed in the state B can be exposed to produce an image of a subject S.

When the completion of photographing of the first one side of microfilm F ($\frac{1}{2}$ of the film width) is detected with the film F loaded on a supply reel, the camera unit 18 can be removed from the main unit 11, and then reversed and re-set to the main unit. This eases reciprocatory recording. Moreover, since the film F is stored in a camera chamber 50, fogging is considerably reduced compared with a conventional apparatus.

Figure 7:
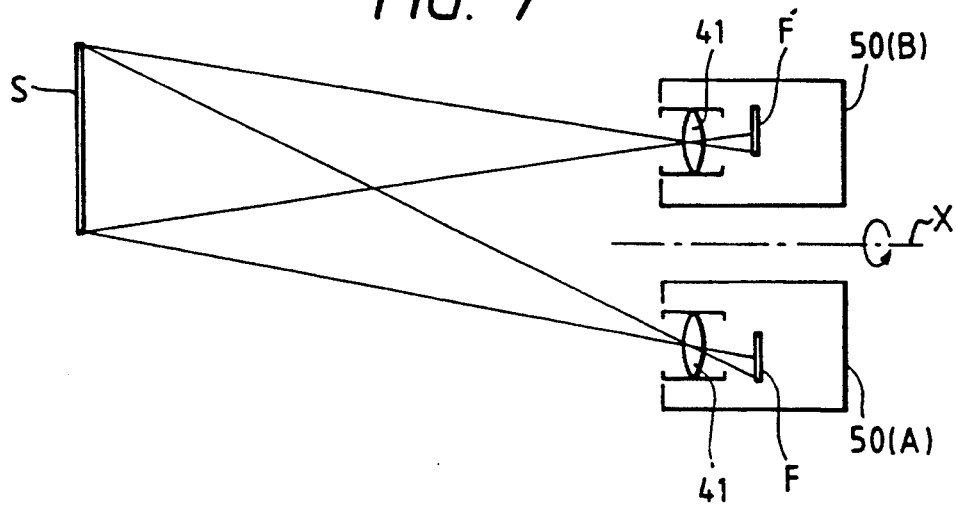
FIG. 7 is a schematic view showing the photographing light path in a photographing apparatus of a second embodiment of this invention.
Figure 8:
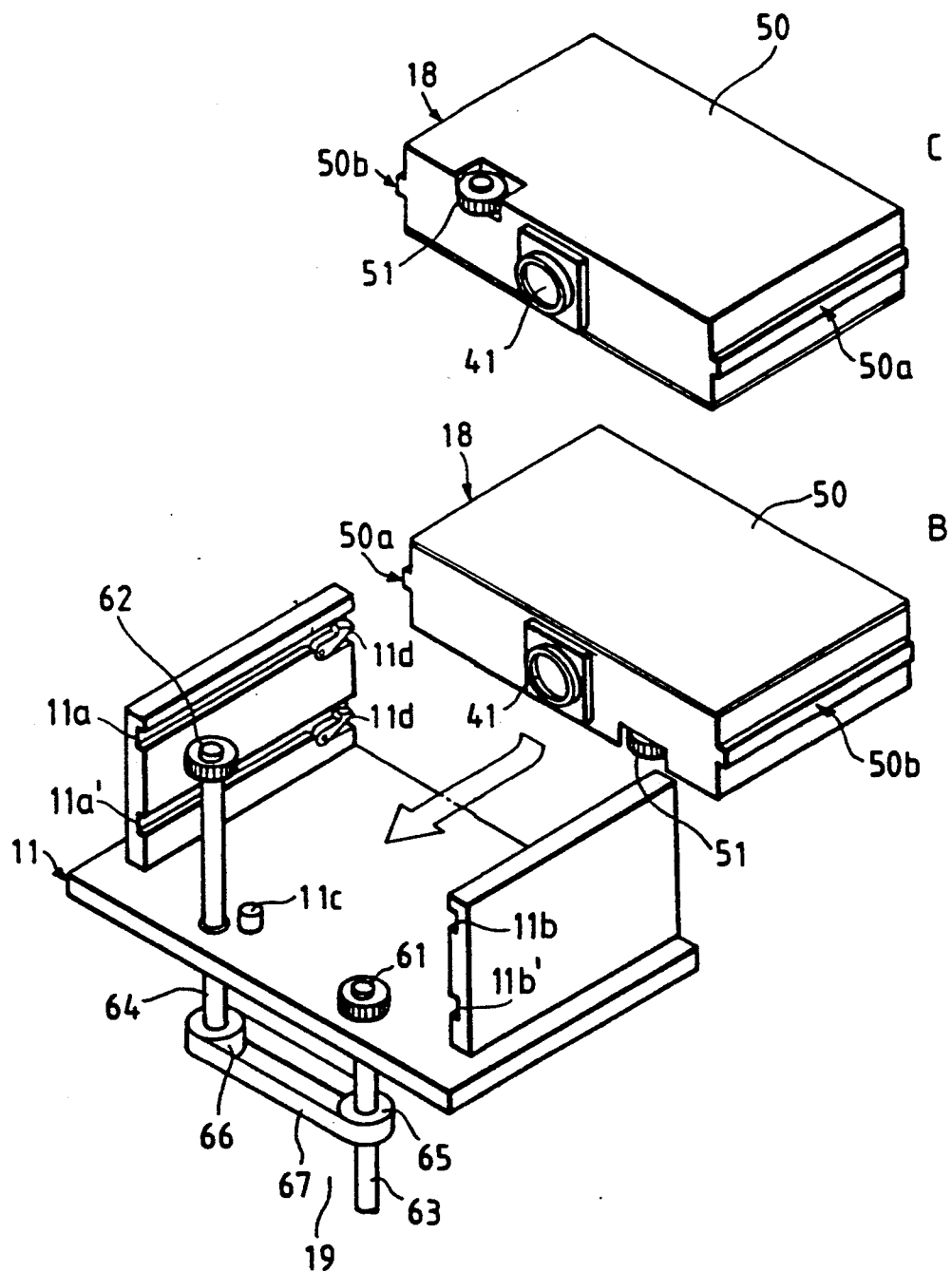
FIG. 8 shows a perspective view demonstrating how to set the camera unit to the photographing apparatus.

FIGS. 7 and 8 show the second embodiment of this invention. For convenience sake, the same reference characters are assigned to the same components as those described in the previous embodiment. The differences are described below.

In the previous embodiment, the reference line X of the photographing lens 41 is set to the same position for both the advancing and reversing paths in reciprocatory recording, that is to say; the light paths are the same for advancing and reversing of the film 1. In this embodiment, however, the sliding rails 11a, 11a' and 11b, 11b' of the main unit 11 are installed in two steps respectively so that the light path for advancing the film will differ from the light path for reversing the film. As shown in B and C of FIG. 8, first and second sliding bars 50a and 50b of the camera unit 18 have different widths. Thereby, when they are reversed and mounted onto the upper or lower sliding rails, they can always be fitted to the correct sliding rails 11a, 11a' and 11b, 11b' of the main unit 11. This kind of incorrect-mounting prevention means is recommended be installed.

In FIGS. 7 and 8, after the first rows of films F and F' in camera chambers 50(A) and 50(B) are exposed to produce subject images as shown in FIG. 7, if the second rows of the films F and F' are exposed, the camera chambers 50(A) and 50(B) are removed from the main unit. Then, the camera chamber 50(A) located in the lower part of the main unit is reversed to the state C in FIG. 8, and mounted to the upper rails 11a, 11a' and 11b, 11b' of the main unit 11. On the other hand, the camera unit 50B located in the upper part of the main unit is reversed to the state B in FIG. 8, and mounted into the lower rails 11a and 11b of the main unit 11. In short, the camera chambers 50(A) and 50 (B) can be turned 180° as a unit with the reference line X as a center, and then mounted to the main unit 11. Thereby, the second rows of films F and F' are exposed. The other configuration is identical to those of the other embodiments. This embodiment permits simultaneous dual photography using two camera units 18.

Figure 9:
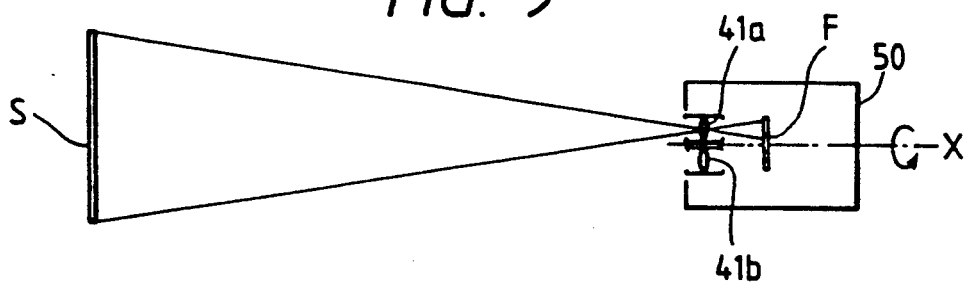
FIG. 9 is a schematic view showing the photographing light path in a photographing apparatus of a third embodiment of this invention.

FIG. 9 shows the third embodiment of this invention.

In this embodiment, a plurality of photographing lenses 41a and 41b are arranged in parallel and symmetric with respect to the center axis of a camera chamber 50 in a camera unit. The lenses 41a and 41b can be switched each other, so that a single side of film F will be exposed according to the reverse position of the camera chamber 50. The other configuration is identical to that of the first embodiment.

Figure 10:
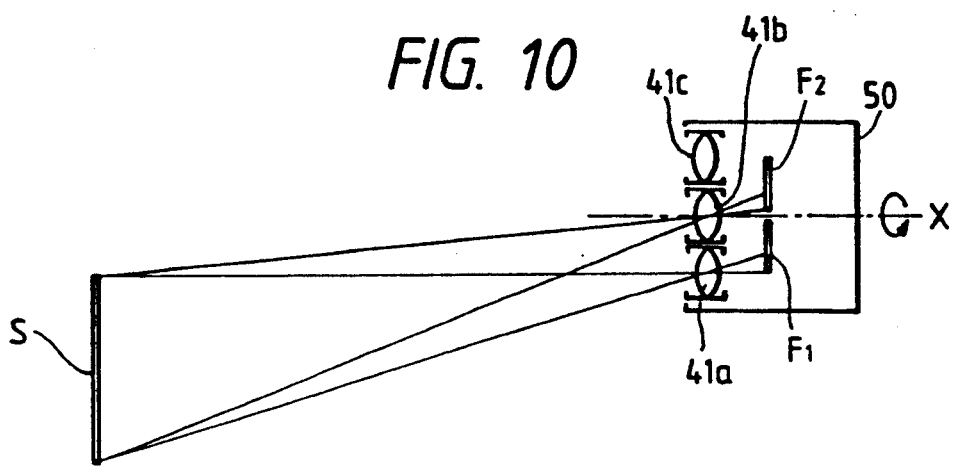
FIG. 10 is a schematic view of the photographic light path in a photographic apparatus of a fourth embodiment of this invention.

FIG. 10 shows the fourth embodiment of this invention.

In this embodiment, a plurality of photographing lenses 41a, 41b, and 41c are arranged in parallel in a camera chamber 50 of a camera unit. The camera chamber 50 can be installed reversely. Two of the photographing lenses 41a to 41c are used to expose one sides of films F1 and F2. The other configuration is identical to that of the first embodiment.

Figure 11:
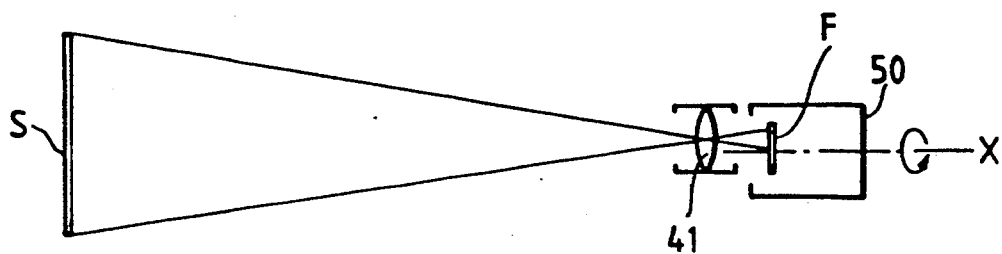
FIG. 11 is a schematic view of the photographing light path in a photographing apparatus of a fifth embodiment of this invention.

FIG. 11 shows the fifth embodiment of this invention.

In this embodiment, a photographing lens 41 is installed in a main unit (unshown) but not in a camera unit. A camera chamber 50 of the camera unit can be installed reversely.

Figure 12:
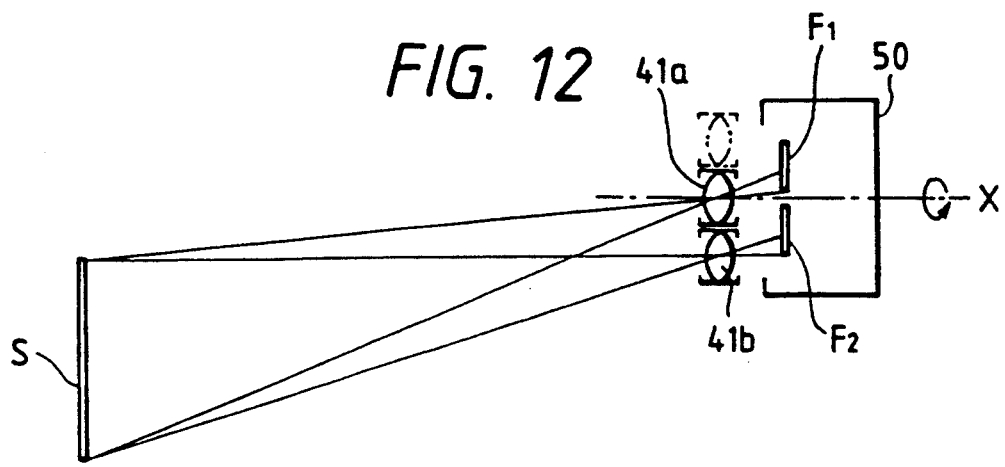
FIGS. 12 and 13 are schematic views of the photographing light paths in photographing apparatuses of the fifth and sixth embodiments of this invention.

FIG. 12 shows the sixth embodiment of this invention, wherein a plurality of photographing lenses 41a and 41b are arranged in parallel in a main unit (unshown) in the same manner as that for the fifth embodiment mentioned previously. In a camera chamber which is supported to be freely reversed in a camera unit, a plurality of films F1 and F2 are installed in parallel and the one sides of these films F1 and F2 are exposed with the photographing lenses 41a and 41b.

In the above embodiments, reflecting means may be installed in a photographing light path, if necessary. This invention can be also applied to a photographing apparatus capable of performing reciprocatory recording and front/back simultaneous recording selectively as well as a photographing apparatus dedicated to reciprocatory recording, whereby the photographing mode shown with the alternate long and two short dashes line in the first embodiment shown in FIG. 6, the fourth embodiment shown in FIG. 10, or the sixth embodiment shown in FIG. 12 can also be used.

Figure 13:
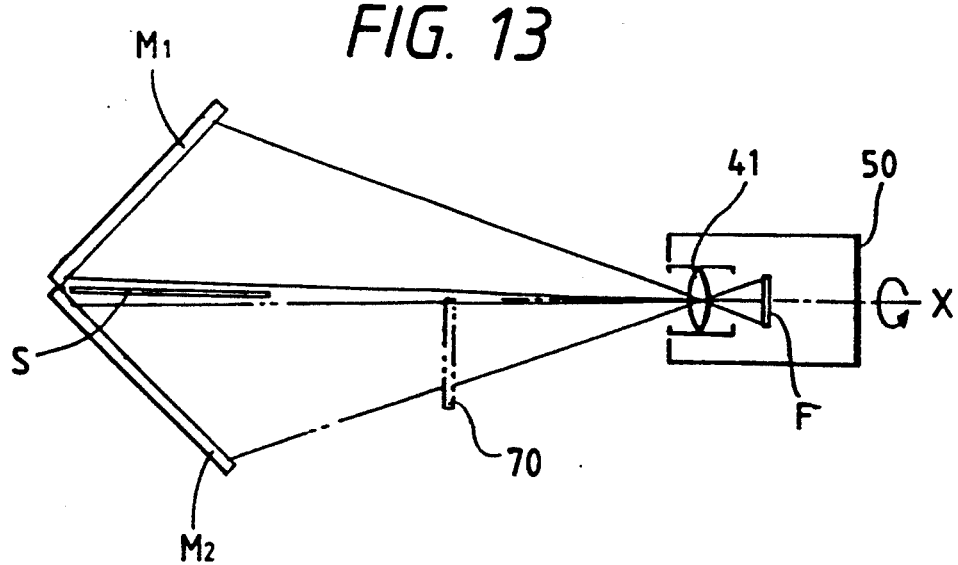

FIG. 13 shows the seventh embodiment of this invention. This invention is applied to a photographing apparatus capable of recording a double-sided subject having images on its both sides. A front-side image of a subject S is formed on the first row of film F via a first mirror M1 and a lens 41. The reverse-side image is formed on the second row of the film F via a second mirror M2 and lens 41. When reciprocatory recording or photographing is performed to form only the front-side image of the subject S on the second row of film using this photographing apparatus, a shutter 70 is inserted in the reflected light path of the second mirror M2 to cut off the light path reflected from the reserve side.

Figure 14:
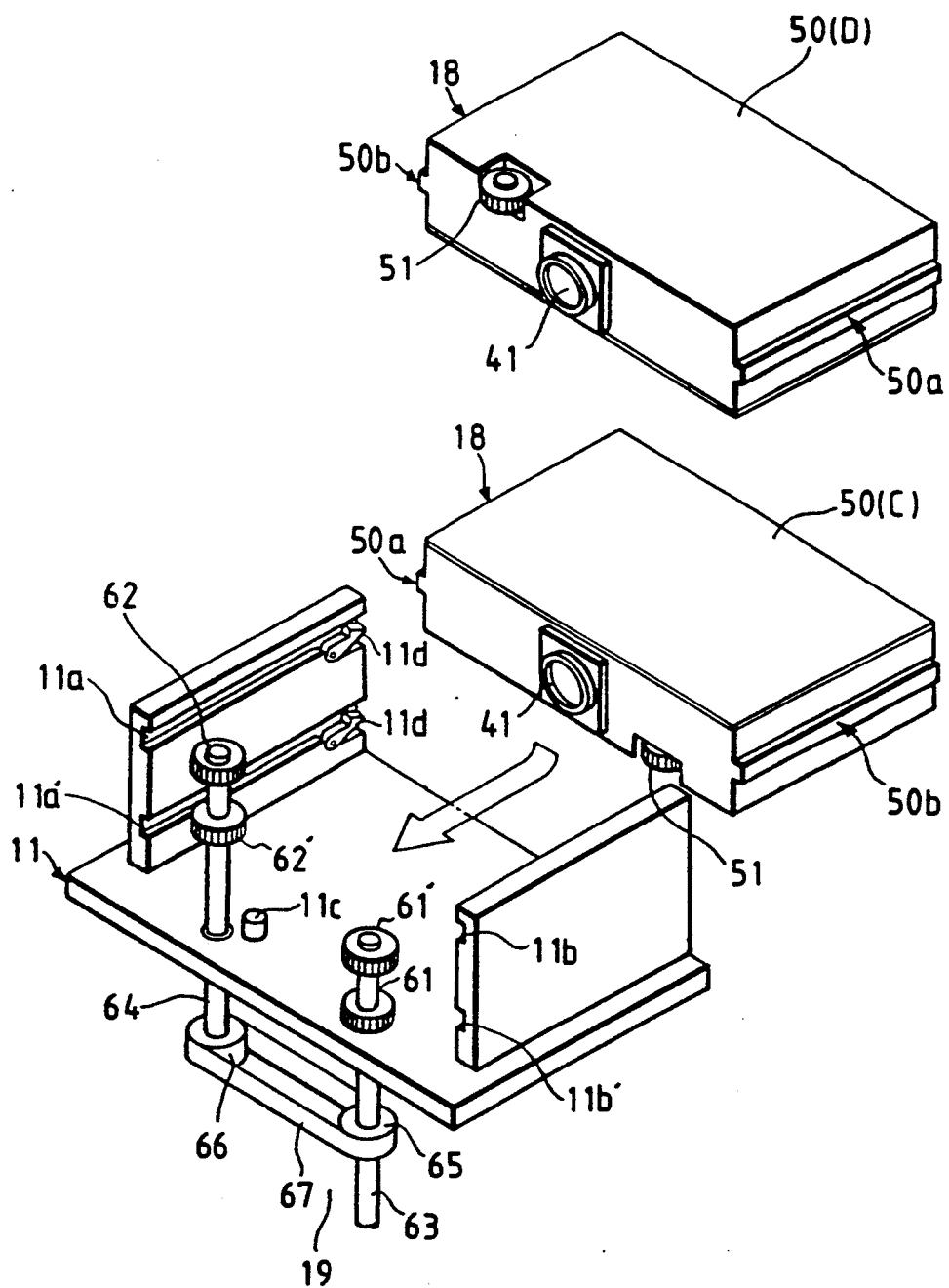
FIG. 14 shows a perspective view demonstrating how to set the camera unit to a photographing apparatus of an eighth embodiment of this invention.
Figure 15:
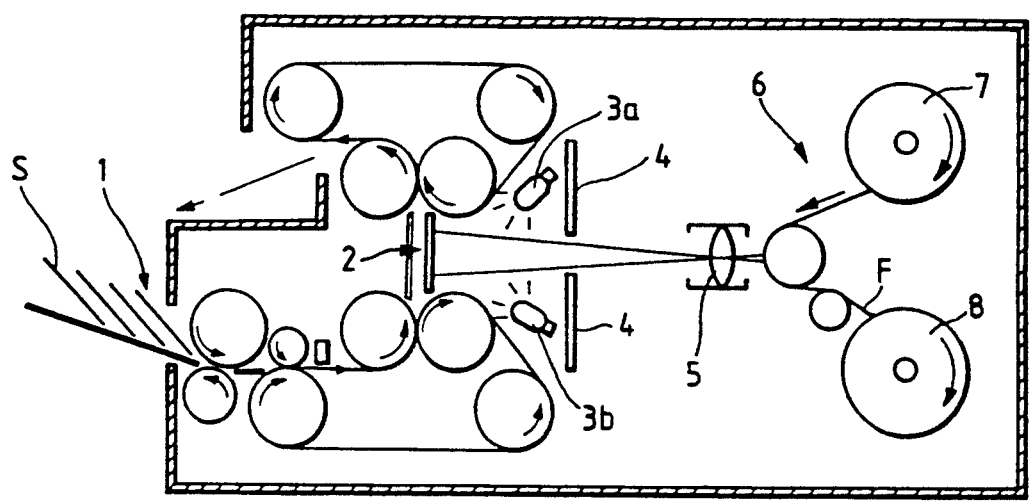
FIG. 15 is a schematic view of a prior photographing apparatus.
Figure 16:
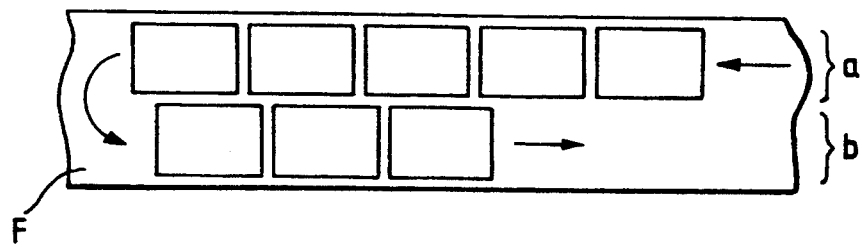
FIG. 16 shows the state of film exposed by the reciprocatory method.

FIG. 14 shows the eighth embodiment of this invention. In the embodiments shown in FIGS. 7 and 8 wherein two camera unit are installed in two steps and photographing is performed in two camera chambers, the cameras are reversed to be set in the different steps. In this embodiment, a lower camera chamber 50(C) is mounted to lower rails 11a' and 11b' of a main unit 11 to be in the state B or C shown in FIG. 3. An upper camera chamber 50(D) is mounted to upper rails 11a and 11b to be in the state B or C shown in FIG. 3. The configurations of the camera chambers 50(C) and 50(D) are identical to those for the first embodiment. However, the sliding bars 50a and 50b of the camera chambers 50(C) and 50(D) have the same shape unlike those in FIG. 8.

On the other hand, the main unit 11 has driving gears 61 and 62' corresponding to a coupling gear 51 of the camera chamber 50(C), and driving gears 61' and 62 corresponding to a coupling gear 51 of the camera chamber 50(D). The driving gears 61 and 61' are installed on a common driving shaft 63, and the other driving gears 62 and 62', on a common subordinate shaft 64. When the coupling gear 51 of the first camera chamber 50(C) is set to the state B, it engages with the gear 61. When the gear 61 is set to the reverse state C, it engages with the driving gear 62'. When the coupling gear 51 of the camera chamber 50(C) is set to the state B, it engages with the gear 61'. When the coupling gear 51 is set to the reverse state C, it engages with the gear 62.

Since the two camera chambers 50(C) and 50(D) have the same configuration, either of them can be mounted on the upper or lower step.

Note that the setting and driving methods of the camera unit, and the locations of clutches are not restricted to the embodiments mentioned so far.

A photographing apparatus in which this invention is adopted, including a film storage unit which is detachable from the main unit and can be installed reversely as mentioned previously, enables a user to replace a film unit for reciprocatory recording with the film loaded in the storage, and helps reduce fogging and improve operability.

We claim:

1. An apparatus for photographing images of originals on an elongated film, comprising:
   first holding means for removably holding a first film storage case in which an elongated film is stored, selectively in a first position and in a second position which is inverted with respect to the first position;
   second holding means for removably holding a second film storage case in which an elongated film is stored, selectively in a first position and in a second position which is inverted with respect to the first position;
   said first and second film storage cases both being the same shape and each being equipped with a film supply reel, a film winding reel, and film transporting means for transporting the film between said film supply reel and said film winding reel;
   a first driving member for driving said film transporting means in said first storage case when said first film storage case is hold by said first holding means in said first position;
   a second driving member for driving said film transporting means in said second film storage case when said second film storage case is held by said second holding means in said second position; and
   optical means for projecting images onto a film stored in each said storage case held by said first and second holding means.

2. A photographing apparatus according to claim 1, wherein said optical means includes an image-forming lens which is arranged in said film storage case.

3. A photographing apparatus according to claim 1, wherein said optical means includes an image-forming lens which is arranged in the main unit of an apparatus.

4. A photographing apparatus according to claim 1, further comprising transport means for feeding originals, wherein said transport means is driven in synchronization with said first and second driving members.

5. A photographing apparatus according to claim 4, wherein said first and second driving members are driven by a common driving source.

6. A photographing apparatus according to claim 5, wherein said each said film transporting means is coupled with said first and second driving members by gears.

7. An apparatus according to claim 1, wherein said first holding means is adapted to hold said second film storage case in the first position, and said second holding means is adapted to hold said first film storage case in the second position.

8. An apparatus according to claim 7, further comprising means for prohibiting said first film storage case from being held in the second position by said first holding means.

9. An apparatus according to claim 7, further comprising means for prohibiting said second film storage case from being held in the first position by said second holding means.

10. An apparatus for photographing images of originals onto an elongated film, comprising:
    first holding means for removably holding a storage unit in which an elongated film is stored, selectively in a first position and in a second position which is inverted with respect to the first position;
    second holding means located at a different position from said first holding means for removably holding said storage unit selectively in the first position and the second position;
    wherein said storage unit includes a film supply reel, a film winding reel, and film transporting means for feeding the film between said supply reel are said winding reel;
    first drive means for driving said film transporting means in said storage unit when said storage means is held in the first position as well as in the second position by said first holding means;
    second drive means for driving said film transporting means in said storage unit when said storage unit is held in the first position as well as in the second position by said second holding means; and
    optical means for focusing an image of an original onto the film in said storage unit.

11. An apparatus according to claim 10, wherein said film transporting means comprises a first gear exposed through an opening formed in said storage unit;
    said first and said second drive means each comprising a second gear for engagement with said first gear of said storage unit held in said first position, and a third gear for engagement with said first gear of said storage unit held in said second position; and
    wherein each of said gears of said first and the second drive means is connected to a corresponding drive source.

12. An apparatus according to claim 11, wherein said second gear and said third gear of said first drive means are provided on a first drive shaft, and said second gear and said third gear of said second drive means are provided on a second drive shaft which is displaced from said first drive shaft.

13. An apparatus according to claim 10, wherein said optical means comprises a photographing lens which is provided in said storage unit.

14. An apparatus according to claim 10, wherein said first and the second holding means each slideably engages said storage unit such that said storage unit may be removably secured to said first and second holding means, and wherein said first and second holding means are mounted independently from each other.

15. A recording apparatus for recording original images on an elongated recording medium, comprising:

first holding means for removably holding a storage case selectively in a first position and in a second position which differs from the first position, wherein said storage case including a supply reel shaft, a winding reel shaft, and transferring means for transferring the recording medium between said supply reel shaft and said winding reel shaft;

second holding means for removably holding said storage case selectively in the first position and the second position;

first drive means for driving said transferring means of said storage case held by said first holding means; and second drive means for transmitting a drive force to transferring means of said storage case held by said second holding means.

* * * * *

UNITED STATES PATENT AND TRADEMARK OFFICE
CERTIFICATE OF CORRECTION

PATENT NO. : 5,166,726
DATED : November 24, 1992
INVENTOR(S) : MATSUMOTO ET AL.

It is certified that error appears in the above-identified patent and that said Letters Patent is hereby corrected as shown below:

COLUMN 2

Line 27, "fifth and sixth" should read --sixth and seventh--.

COLUMN 4

Line 54, "each" should read --to each--.

COLUMN 6

Line 24, "sides" should read --side--.

COLUMN 7

Line 60, "hold" should read --held--.

COLUMN 10

Line 4, "including" should read --includes--.

Signed and Sealed this

Twenty-third Day of November, 1993

Attest:

BRUCE LEHMAN

*Attesting Officer*  *Commissioner of Patents and Trademarks*